United States Patent
Gao et al.

(10) Patent No.: US 9,042,927 B2
(45) Date of Patent: May 26, 2015

(54) METHOD AND DEVICE FOR PERFORMING SPACE COORDINATION AMONG CELLS

(75) Inventors: Qiubin Gao, Beijing (CN); Deshan Miao, Beijing (CN); Ying Peng, Beijing (CN); Shaohui Sun, Beijing (CN)

(73) Assignee: XIAOMI, INC., Beijing (CN)

( * ) Notice: Subject to any disclaimer, the term of this patent is extended or adjusted under 35 U.S.C. 154(b) by 794 days.

(21) Appl. No.: 13/386,423

(22) PCT Filed: Sep. 28, 2010

(86) PCT No.: PCT/CN2010/077428
§ 371 (c)(1),
(2), (4) Date: Jan. 22, 2012

(87) PCT Pub. No.: WO2011/038675
PCT Pub. Date: Apr. 7, 2011

(65) Prior Publication Data
US 2012/0122507 A1    May 17, 2012

(30) Foreign Application Priority Data

Sep. 29, 2009 (CN) .......................... 2009 1 0093390

(51) Int. Cl.
| | |
|---|---|
| *H04B 7/00* | (2006.01) |
| *H04W 72/12* | (2009.01) |
| *H04B 7/02* | (2006.01) |
| *H04J 11/00* | (2006.01) |
| *H04W 16/28* | (2009.01) |
| *H04W 92/20* | (2009.01) |

(52) U.S. Cl.
CPC ........... *H04W 72/1278* (2013.01); *H04B 7/024* (2013.01); *H04J 11/0053* (2013.01); *H04W 16/28* (2013.01); *H04W 92/20* (2013.01)

(58) Field of Classification Search
CPC .... H04B 7/024; H04B 7/0617; H04B 7/0626; H04W 72/1278; H04W 16/28; H04W 92/20; H04W 84/045; H04W 24/10; H04W 48/04; H04W 72/04; H04W 72/0426; H04W 72/082; H04J 11/0053
USPC ........ 455/452.2, 452.1, 436, 422.1, 450, 509, 455/418
See application file for complete search history.

(56) References Cited

U.S. PATENT DOCUMENTS

| | | | | |
|---|---|---|---|---|
| 2011/0217985 | A1* | 9/2011 | Gorokhov | 455/452.2 |
| 2011/0319066 | A1* | 12/2011 | Chou et al. | 455/422.1 |
| 2012/0244900 | A1* | 9/2012 | Tian et al. | 455/509 |
| 2014/0242960 | A1* | 8/2014 | Cai et al. | 455/418 |
| 2014/0342748 | A1* | 11/2014 | Zou | 455/452.1 |

FOREIGN PATENT DOCUMENTS

| | | |
|---|---|---|
| CN | 101159475 A | 4/2008 |
| CN | 101400139 A | 4/2009 |
| WO | 2009113150 A1 | 9/2009 |

OTHER PUBLICATIONS

International Search Report issued International Application No. PCT/CN2010/077428, dated Jan. 6, 2011.

* cited by examiner

*Primary Examiner* — Sujatha Sharma
(74) *Attorney, Agent, or Firm* — Handal & Morofsky, LLC

(57) ABSTRACT

A method and a device for performing space coordination among cells are disclosed in the present invention, and the method includes that a base station in a serving cell acquires the channel information of a terminal; the base station in said serving cell performs pre-scheduling to said terminal, according to the acquired channel information of said terminal and the service requirement of said terminal; the base station in said serving cell transfers the pre-scheduling information to the base station in said coordinated cell, so that the base station in said coordinated cell performs coordinated scheduling/coordinated beam-forming with the base station in said serving cell together, according to said pre-scheduling information. With the solution of the present invention, the pre-scheduling information is transferred between base stations in various coordinated transmission cells, and the coordinated scheduling/beam-forming is performed according to the pre-scheduling information, thus, the coordinated scheduling/beam-forming is implemented with less amount of information exchange, and the spectrum efficiency of cell-edge terminal is improved.

17 Claims, 6 Drawing Sheets

METHOD AND DEVICE FOR PERFORMING SPACE COORDINATION AMONG CELLS

This application claims the priority of China Patent Application Ser. NO. 200910093390.0, entitled METHOD AND DEVICE FOR PERFORMING SPACE COORDINATION AMONG CELLS, submitted on Sep. 29, 2009, the contents of which are hereby incorporated in their entirety.

TECHNICAL FIELD

The present invention relates generally to communication technology, and, more particularly, to a method and device for performing space coordination among cells.

BACKGROUND

In the LTE-Advanced (Long Term Evolution Advanced) systems of 3GPP (3rd Generation Partnership Project), the multi-cell coordinated transmission technology is adopted to improve the service quality for cell-edge users.

ITU (International Telecommunications Union) has make a very strict requirement for the performance of IMT-Advanced (International Mobile Telecom System Advanced), which is next-generation mobile communication system. For instance, the maximum system transmission bandwidth needs to reach 100 MHz; the peak data rate of downlink and uplink data transmission needs to reach 1 Gbps and 500 Mbps. Meanwhile, the requirements for the average link spectral efficiency and the cell edge spectral efficiency is also very strict to the system.

To meet the requirement of new IMT-Advanced system, 3GPP suggests adopting multipoint coordinated transmission technology in its next-generation mobile communication system, which is LTE-Advanced, so as to improve the performance of system. The multipoint coordinated transmission technology is the cooperation between multiple transmission points which are geographically separated. Generally speaking, the multiple transmission points represent the base stations in different cells. The multipoint coordinated transmission technology is classified into downlink coordinated transmission and uplink combined reception.

The downlink coordinated transmission is classified into two categories: coordinated scheduling/beam-forming and joint transmission.

In joint transmission, all the base stations in all cells that in the set of coordinated cell send data which are the same or different to terminal by the same wireless resource block, the base stations in multiple coordination cells send the data to the same terminal at the same time. Through joint transmission, the interference signal among different cells which in LTE system are transferred into useful signal, which decreases the interference among cells and improves the performance of system.

FIG. 1 is a schematic diagram of coordinative transmission of two cells through collaborative approach in present techniques. In FIG. 1, the base stations of two cells send data to terminal at the same time, the signal sent by the base stations of the two cells are combined in the air and then received by UE (User Equipment), the interference among cells is decreased efficiently and the quality of transmission signal are improved, which increases the average spectral efficiency and the cell-edge transmission rates.

In CS/CBF (Coordinated Scheduling/Coordinated Beam-forming), only UE serving cell sends data to UE, in which point is equal with the present standard and transmission mode of LTE. Other cells in the set of coordinated cell could provide service for different UE through same wireless resource block. However, in LTE standard, the base stations in each cell sending signal without taking account of the interference to the other signal sent by the base station in other cells, the sending direction and the resource of signal in cells are not coordinated. And the base station in each cell which in the set of CBF coordinated cell needs to coordinate according to the interference to the signal of other cells, so as to decrease the interference to UE in other cells as much as possible. By coordinating the direction of sending signal beam, the coordinated cells could avoid beams with large interference efficiently, which decreases the inter-cell interference and increases the quality of receiving signal.

FIG. 2 is a schematic diagram of two coordinated cells avoiding the direction of signal beam sent by serving cell through beam coordinated scheduling in present techniques.

The joint transmission requires all cells participated in coordinating obtaining data packets which is to be sent to UE. Generally speaking, the data packets of UE are transmitted from the base station of UE serving cell to the base station in UE coordinated cell through X2 interface, which costs much and become a bottleneck that restricts the application of joint transmission.

According to embodiments of the invention, the applicant found at least following problems in present technique:

In the CBF scheme, the data are only sent from UE serving cells, which avoid the high cost of transmitting data information through X2 interface. However, the timely sharing of coordination information is a prerequisite for neighbor cells to avoid beams. The time delay and the capacity of X2 interface is strictly required in sharing coordination information, which weigh heavily against the effectiveness of CBF scheme in real system.

Presently the known CBF scheme needs to transmit coordinating information in the subband of each subframe to neighbor cells, the expenses on X2 costs much, so it has difficulty in widespread availability.

Contents of the Invention

The embodiments of the invention provide a method and a device for performing space coordination among cells, which enables the pre-scheduling information of the terminal being transmitted among the base station in each coordinative transmission cell, and performing coordinated scheduling/beam-forming according to the scheduling information.

To achieve the above-mentioned purpose, on one hand the embodiments of the invention provide a method for performing space coordination among cells, which applies in mobile communication system that comprises multiple cells, one of said multiple cells is the serving cell of terminal, one or more cells of the other cells are coordinated cell of said terminal, the base station that corresponding to each said cell provide cooperative transmission service for said terminal, comprising:

The base station in said serving cell obtaining the channel information of said terminal;

The base station in the said serving cell performs pre-scheduling to said terminal, according to the acquired channel information of said terminal and the service requirement of said terminal;

The base station in said serving cell transfers the pre-scheduling information to the base station in said coordinated cell, so that the base station in said coordinated cell performs coordinated scheduling/coordinated beam-forming with the base station in said serving cell together, according to said pre-scheduling information.

On the other hand, the embodiments of the invention provide a method for performing space coordination among cells, which applies in mobile communication system that comprises multiple cells, one of said multiple cells is the serving cell of terminal, one or more cells in the other cells are coordinated cell of said terminal, the base station that corresponding to each said cell provide cooperative transmission service for said terminal, comprising:

The base station in said serving cell receiving the pre-scheduling information sent by the base station in coordinated cell and the channel information of the terminal which to be scheduled in serving cell;

The base station in said serving cell according to said pre-scheduling information and the channel information of the terminal which to be scheduled in said serving cell, performs coordinated scheduling/coordinated beam-forming.

On the other hand, the embodiments of the invention also provide a base station, which applies in the mobile communication system that comprise multiple cells, one cell of said multiple cells is serving cell of terminal, one or more cells of the other cells are coordinated cell of said terminal, the base station that corresponding to each said cell provide cooperative transmission service for said terminal, when said base station is corresponding to said serving cell, comprising:

Obtaining module for obtaining the channel information of said terminal;

Pre-scheduling module for performing pre-scheduling to said terminal based on the obtained channel information of said terminal and the service requirement of said terminal;

Sending module for transmitting the pre-scheduling information which generated by said scheduling module to the base station in said coordinated cell, so that the base station in coordinated cell could perform coordinated scheduling/coordinated beam-forming together with the base station in serving cell according to said pre-scheduling information.

On the other hand, the embodiments of the invention also provide a base station, which applies in the mobile communication system that comprise multiple cells, one cell of said multiple cells is serving cell of terminal, one or more cells of the other cells are coordinated cell of said terminal, the base station that corresponding to each said cell provide cooperative transmission service for said terminal, when said base station is corresponding to said serving cell, comprising:

Receiving module for receiving the pre-scheduling information sent by the base station in said coordinated cell and the channel information of the terminal which to be scheduled in said serving cell;

Scheduling module for performing coordinated scheduling/coordinated beam-forming based on the pre-scheduling information received by said receiving module and the channel information of the terminal which to be scheduled in said serving cell.

Compared with present techniques, the embodiment of the invention has the following advantages With the solution of the present invention, the pre-scheduling information is transferred between base stations in various coordinated transmission cells, and the coordinated scheduling/beam-forming is performed according to the pre-scheduling information, thus, the coordinated scheduling/beam-forming is implemented with less amount of information exchange, and the spectrum efficiency of cell-edge terminal is improved.

DESCRIPTION OF EXAMPLE EMBODIMENTS

As stated in background technology, presently the known CBF scheme needs to transmit coordinating information in the subband of each subframe to coordinated cell which conduct cooperative transmission, therefore a large information flow are produced, which cause a lot of burden on interface which transmitting coordinating information, in the specific application scenario, especially to X2 interfaces, the needs of resource expenses is very large, so it has difficulty in network widespread availability Aiming at the above-mentioned problems, by transmitting pre-scheduling information between the base stations that conduct cooperative transmission, which in each cell, the corresponding base station could conduct coordinated scheduling/beam-forming according to pre-scheduling information.

According to above-mentioned technical ideas, a method and a device for performing space coordination among cells are provided in the embodiments of the present invention, which applies in mobile communication system that comprises multiple cells, one of the multiple cells is the serving cell of terminal, one or more cells of the other cells are coordinated cell of terminal, the base station that corresponding to each cell provide cooperative transmission service for terminal.

Figure 1:
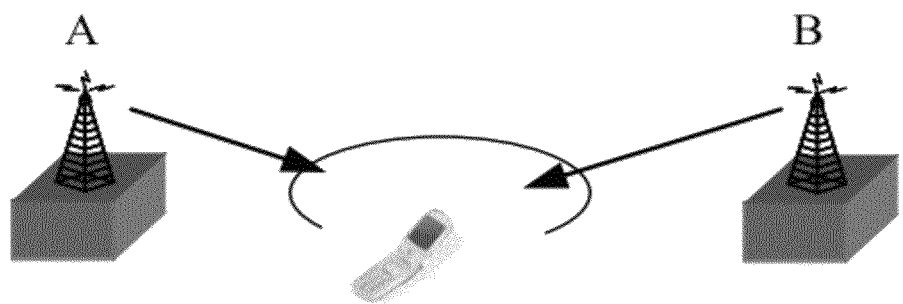
FIG. 1 is a schematic diagram of coordinative transmission of two cells through collaborative approach in present techniques.
Figure 2:
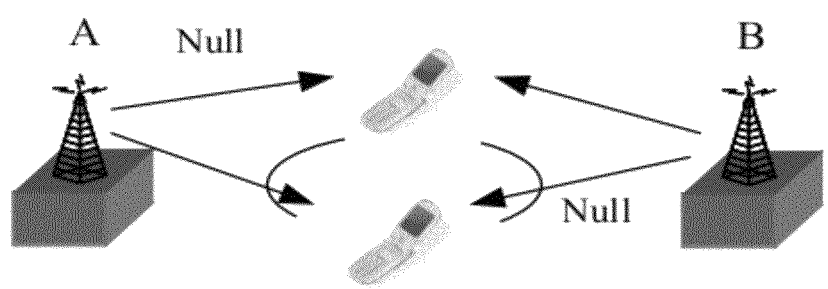
FIG. 2 is a schematic diagram of two coordinated cells avoiding the direction of signal beam sent by serving cell through beam coordinated scheduling in present techniques.
Figure 3:
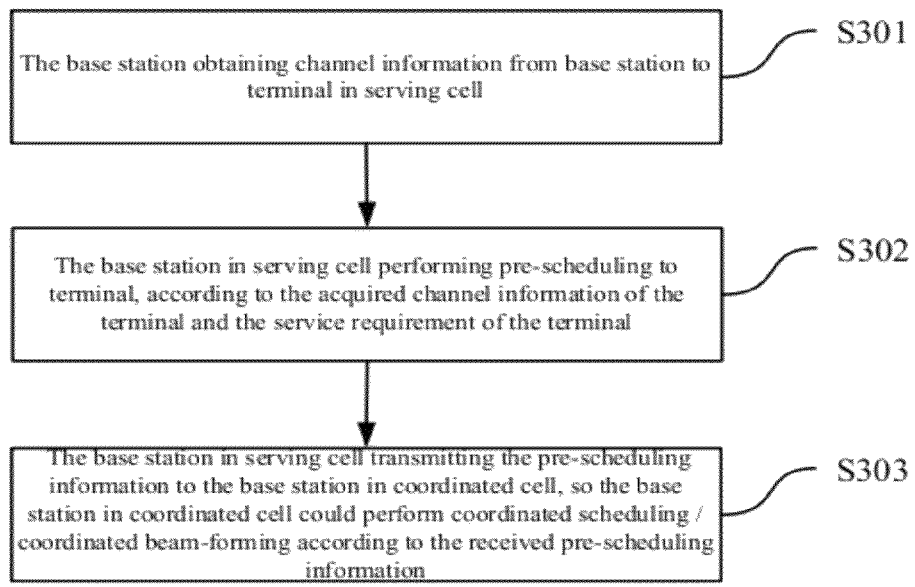
FIG. 3 is a schematic flow of a method for performing space coordination among cells provided by the embodiment of the invention.

FIG. 3 is a schematic flow of a method for performing space coordination among cells provided by the embodiment of the invention, comprising following steps:

Step 301, the base station obtaining channel information from base station to terminal in serving cell.

Therein, the base station obtaining channel information from base station to terminal in serving cell, comprising following two situations:

(1) The base station in serving cell receiving reported channel information from terminal.

In this situation, terminal send its own channel information to base station directly, the base station determine the channel information which from the base station in serving cell to the terminal according to the received channel information.

(2) The base station in serving cell receiving the SRS (Sounding Reference Signal) which sent from terminal, and obtaining the channel information of the terminal.

In this situation, terminal needs to send SRS signal to base station, previously, the base station in serving cell sends SRS scheduling information to the terminal which to be scheduled directly, moreover, the base station in serving cell also needs to send SRS scheduling information to the base station in coordinated cell, in addition, the base station in coordinated needs to receive SRS signal which sent by the terminal in corresponding instructions.

In the specific application scenarios, the aforementioned SRS relevant strategy could be adjusted according to the specific need of system, Whichever the strategy is applied will not affect the protection range of the present invention.

On the other hand, while the base station obtaining the channel information which from the base station in serving cell to terminal, the base station also obtains the channel information which from the base station in coordinated cell to terminal, specifically the channel information comprise following types:

(1) The WPI (Worst Precoding matrix Indicator) of coordinated cell (e.g., the related information of the worst precoding matrix in coordinated cell), which represent it is not appropriate for coordinated cell to use the precoding matrix which corresponding to the WPI to conduct precoding for terminal in coordinated cell.

(2) The BPI (Best Precoding matrix Indicator) of coordinated cell (e.g., the related information of the best precoding matrix in coordinated cell), which represent the coordinated cell could give priority to the precoding matrix which corresponding to BPI to conduct precoding for terminal in coordinated cell.

(3) The precoding matrix occupancy information comprised in the pre-scheduling information which sent by the base station in coordinated cell.

The main issue of the pattern is that the current base station could either be the base station in serving cell of the terminal, or the base station in coordinated cell of other terminals, therefore, the base station might receive pre-scheduling information from the base station in other coordinated cell, also these pre-scheduling information will refer to the resource occupancy information of current system, thereby, according to the resource occupancy information, in conducting corresponding pre-scheduling, the base station could rationally allocate and manage corresponding resources, avoiding allocating the recourse with large interference.

(4) The base station in a coordinated cell receiving SRS signal from terminal, and obtaining the channel information of the terminal according to the SRS signal.

(5) The information of channel status from the base station in coordinated cell to UE itself.

Therein, the channel information that corresponding to the aforementioned (1), (2), (3), (5) could be fedback from UE to the base station in its serving cell, and could be fedback from UE to the base station in its coordinated cell might as well.

It should be noted here that there could be more than one BPI and WPI to be reported by UE for each coordinated cell, corresponding to the one or more precoding matrix with the weakest interference and the one or more precoding matrix with the strongest interference, respectively.

Step 302, the base station in serving cell performing pre-scheduling to terminal, according to the acquired channel information of the terminal and the service requirement of the terminal.

As the Step 301 mentioned, if the base station also receive the PMI (Precoding Matrix Indicator) and/or the WPI information which sent by the base station in coordinated cell, the steps in the process flow has divided into the three following conditions specifically:

Situation 1, when the information which received by the base station in coordinated cell comprise WPI, the base station performs pre-scheduling according to the WPI information and the PMI information and the service requirement of the terminal which reported by the terminal, while performing pre-scheduling, the base station try to avoid occupying the resource corresponding to the WPI.

In this situation, when received pre-scheduling information from the base station in coordinated cell, the base station first conform which UE are scheduled by coordinated cell in each subband and what space information the UE are corresponding to.

For instance, the coordinated cell has pre-scheduled 2 UE in one subband, UE1 and UE2 respectively, the WPI in this subband for UE1 is WPI1, and the WPI in this subband for UE2 is WPI2. The method for pre-scheduling is: in this subband, if the precoding matrix that corresponding to a PMI which reported by a terminal or calculated by channel information is equivalent or similar with (WPI1 or WPI2) the corresponding precoding matrix, then the base station should avoid scheduling the UE in this subband.

Situation 2, when being received the BPI from the base station in coordinated cell, according to the BPI information and the information of PMI and WPI and the service requirement of terminal that reported by the terminal, while performing pre-scheduling, the base station occupy the resource corresponding to the BPI preferentially.

In this situation, when being received pre-scheduling information from the base station in coordinated cell, which UE are coordinated and what space information the UE are corresponding to by coordinated cell in each subband should be confirmed by the base station first.

For instance, the coordinated cell has pre-scheduled 2 UE in one subband, UE1 and UE2 respectively, the WPI in this subband for UE1 is BPI1, and the WPI in this subband for UE2 is BPI2. The method for pre-scheduling is: in this subband, if the precoding matrix that corresponding to a PMI which reported by a terminal or calculated by channel information is equivalent or similar with (BPI 1 or BPI 2) the corresponding precoding matrix, then the base station should occupy the resource corresponding to the BPI preferentially.

Situation 3, when being received the resource occupancy information from the base station in other coordinated cell, according to the resource occupancy information and the information of PMI and WPI and the service requirement of the terminal that reported by the terminal, the base station choose the resource with the smallest interference to perform pre-scheduling to the terminal.

In this situation, when being received the pre-scheduling information from the base station in coordinated cell, the base station first conform which UE are scheduled by coordinated cell in each subband and what space information the UE are corresponding to, then choose the resource with the smallest interference to perform pre-scheduling to terminal.

Step 303, the base station in serving cell transmitting the pre-scheduling information to the base station in coordinated cell, so the base station in coordinated cell could perform coordinated scheduling/coordinated beam-forming according to the received pre-scheduling information.

In specific applications scenarios, the pre-scheduling information comprising:

The identification information of terminal, the resource information which allocated to the terminal and/or the space information of the resource corresponding to the terminal.

According to whether comprising the space information of the resource corresponding to the terminal, the follow-up process of this step has divided into two situations as well:

Situations 1, pre-scheduling information comprise the space information of the resource corresponding to the terminal.

In particular, if the channel information of resource corresponding to the terminal is the WPI of the resource corresponding to the terminal, according to the pre-scheduling information, the base station in serving cell perform coordinated scheduling/coordinated beam-forming together with the base station in coordinated cell, comprising:

The serving cell calculating the precoding matrix of the terminal to be scheduled through the following formula:

$$[F_1, F_2] = \begin{bmatrix} H \\ V^H \end{bmatrix}^H \left( \begin{bmatrix} H \\ V^H \end{bmatrix} \begin{bmatrix} H \\ V^H \end{bmatrix}^H + \alpha I \right)^{-1}$$

H is the channel matrix of the terminal which to be scheduled;

V is the precoding matrix which corresponding to the WPI;

$\alpha$ is regularization factors;

$F_1$ is the precoding matrix of the terminal which to be scheduled.

Or, the coordinated cell simply schedule the terminal to which the PMI reported is equivalent or similar with the WPI transmitted by the base station in coordinated cell at a lower priority.

In particular, if the channel information of the resource which corresponding to terminal is the BPI of the resource which corresponding to the terminal, according to the pre-scheduling information, the base station in coordinated cell schedule the terminal to which PMI reported is equivalent or similar with the BPI transmitted by the base station in coordinated cell at a higher priority.

Situations 2, the pre-scheduling information do not comprise the channel information of the resource which corresponding to the terminal.

As the base station in coordinated cell could obtain the channel information which from terminal to coordinated cell through SRS signal that sent from the terminal, so the base station in coordinated cell could directly perform coordinated scheduling/coordinated beam-forming according to the identification information of terminal and the resource information which allocated to the terminal, among which includes following two methods:

(1) The BS in the coordinated cell ensuring that the angle of signal arriving at the BS of the serving cell between the terminal which is might to be scheduled in the coordinated cell and the terminal which is to be scheduled in the serving cell would be higher than a pre-defined threshold value.

(2) The coordinated cell calculating the available resource of precoding matrix through the following formula:

$$[F_1, F_2] = \begin{bmatrix} H_1 \\ H_2 \end{bmatrix}^H \left( \begin{bmatrix} H_1 \\ H_2 \end{bmatrix} \begin{bmatrix} H_1 \\ H_2 \end{bmatrix}^H + \alpha I \right)^{-1}$$

$H_1$ is the channel matrix of the terminal to be scheduled in serving cell;

$H_2$ is the channel matrix of the terminal in coordinated cell;

$\alpha$ is regularization factors;

$F_1$ is the precoding matrix of the terminal which to be scheduled.

Situations 3, the pre-scheduling information comprising the information of channel status itself, which is in the resource in coordinated cell that corresponding to the terminal.

The specific processing method is similar with that of situation 2.

Situations 4, the pre-scheduling information comprising the PMI corresponding to the precoding matrix used by the terminal in the corresponding resource of its serving cell.

Furthermore, the base station in serving cell could also receive the pre-scheduling information aiming at scheduling the terminal in coordinated cell, which is sent from the base station in the coordinated cell, the specific processing comprising:

(1) The base station in serving cell receiving the pre-scheduling information sent by the base station in coordinated cell and the channel information of the terminal which to be scheduled in serving cell.

Thereinto, the pre-scheduling information received by the base station in the serving cell which is sent from the base station in coordinated cell, specific comprising:

The identification information of the terminal to be scheduled in coordinated cell, the resource information which allocated to the terminal to be scheduled in coordinated cell and/or the precoding matrix information of the resource corresponding to the terminal to be scheduled in coordinated cell.

The channel information of the terminal to be scheduled in the serving cell, specific comprising:

The identification information of the terminal in serving cell, the resource information which allocated to the terminal and/or the precoding matrix information of the resource corresponding to the terminal.

(2) The base station in serving cell performing coordinated scheduling/coordinated beam-forming according to the pre-scheduling information and the channel information of the terminal to be scheduled.

In particular, the processing comprising:

The BS in serving cell ensuring that the angle of signal arriving at the BS of the serving cell between the terminal which is pre-scheduled in coordinated cell and the terminal which is to be scheduled in the serving cell would be higher than a pre-defined threshold value; or, The base station in serving cell calculating the precoding matrix of the terminal which to be scheduled according to the channel information of the terminal to be scheduled and the resource information which allocated to the terminal to be scheduled in coordinated cell and/or the precoding matrix information of the resource corresponding to the terminal.

Compared with present techniques, the embodiment of the invention has the following advantages:

With the solution of the present invention, the pre-scheduling information is transferred between base stations in various coordinated transmission cells, and the coordinated scheduling/beam-forming is performed according to the pre-scheduling information, thus, the coordinated scheduling/beam-forming is implemented with less amount of information exchange, and the spectrum efficiency of cell-edge terminal is improved.

Below, combined with specific application scenarios, the technical proposal of the embodiment of the invention is to be introduced.

Figure 4:
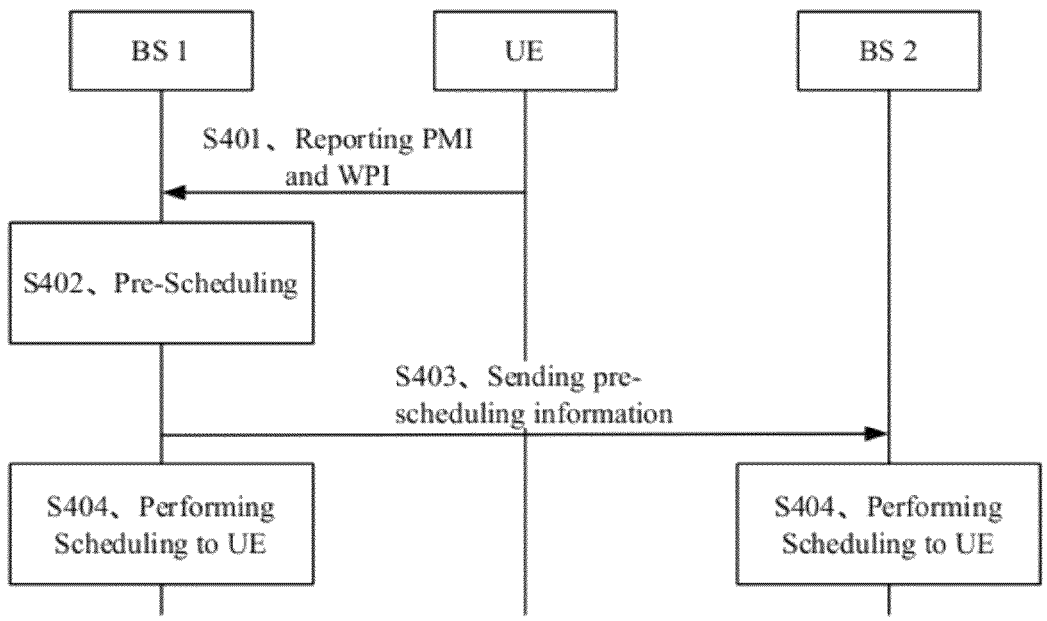
FIG. 4 is a schematic flow of a method for performing space coordination among cells in specific application scenarios, which provided by the embodiment of the invention.

The specific introduction flow has divided into three proposals; the corresponding explanation is as follows:

FIG. 4 is a schematic flow of a method for performing space coordination among cells in specific application scenarios, which is provided by the embodiment of the invention, in particular comprising following steps:

Step 401, UE reporting PMI and WPI to the base station in serving cell.

On the one hand, UE choose precoding matrix through the channel which from the base station in serving cell to the UE, and reporting in sending PMI to base station.

UE reporting the index of the precoding matrix which in a collection of codebook to base station, the selection criterions for PMI is as follows:

$$\text{PMI} = \arg\max_{k \in \{1,2,\ldots N\}} \|H_1 V_k\|^2$$

N is the number of element in the set of codebook,
$\{V_1, \ldots, V_N\}$ is pre-defined codebook,
$H_1$ is the channel matrix from the base station in the serving cell to the UE.

On the other hand, UE choose precoding matrix based on the channel which from the base station in the coordinated cell to the UE, the precoding matrix which is chosen is with the largest interference to the UE, and from a same collection of codebook, the index of the chosen precoding matrix in code book is noted WPI.

WPI means that if the UE is scheduled in one subband, the coordinated cell sending data at corresponding subband by the precoding matrix which corresponding to the WPI will produce a strong interference to UE, which means the coordinated cell should try to avoid using the precoding matrix which corresponding to the WPI.

UE reporting the WPI of coordinated cell to serving cell. The selection criterions for WPI is as follows:

$$\text{WPI} = \arg\max_{k \in \{1,2,\ldots N\}} \|H_2 V_k\|^2$$

N is the number of element in the set of codebook,
$H_2$ is the channel matrix from the base station in the coordinated cell to the UE.
$\{V_1, \ldots, V_N\}$ is pre-defined codebook.

PMI and WPI could be reported by wideband, as well as by subband. The codebook used by PMI and WPI could either be the same or different, moreover, the selection criterions for PMI and WPI is just a preferred embodiment of the present invention, and it will vary based on the specific system needs, with no effect on the protection range of present invention.

Step 402, according to the PMI and WPI information reported by the UE in the cell and the WPI information transmitted from the base station in coordinated cell, and the service requirement of UE, the base station pre-allocating spectrum resource for UE.

On that basis, the UE would be scheduled in pre-allocated resource for a period of time in the future. The resource pre-allocated to different UE could be overlapped in frequency domain. One preferred approach is to require the WPI of coordinated cell which is reported by the UE in which the spectrum resource overlapped to be the same or similar.

Step 403, the base station transmitting the determined pre-allocated resource information for each UE to the base station in coordinated cell.

The information transmitted comprise: the identification of UE, the resource allocated to the UE (subband), the WPI information for the UE in corresponding coordinated cell.

It needs to be mentioned that the WPI information reported by UE is corresponding to the coordinated cell, the UE has a corresponding WPI in each coordinated cell, therefore, after performing pre-scheduling, it is the WPI information which corresponding to the coordinated cell that the base station needs to transmit to the base station in the coordinated cell.

Step 404, the base station performing coordinated scheduling based on the resource information pre-allocated to serving cell and coordinated cell.

The pre-allocated resource which is allocated by the resource on each subband at a higher priority comprising the subband of the UE, moreover, each base station receiving the pre-scheduled information from coordinated cell, as a result, when scheduling in each subband, the base station should try to avoid using the WPI in which the UE is pre-scheduled in the subband by the coordinated cell, or avoid using approximate precoding matrix.

Furthermore, actually the WPI could be treated as a direction information, the base station could control the interference on this direction by signal processing algorithms such as ZF algorithm while scheduling.

$$[F_1, F_2] = \begin{bmatrix} H \\ V^H \end{bmatrix}^H \left( \begin{bmatrix} H \\ V^H \end{bmatrix} \begin{bmatrix} H \\ V^H \end{bmatrix}^H + \alpha I \right)^{-1}$$

H is the channel matrix of the UE to be scheduled,
V is the precoding matrix corresponding to WPI,
α is regularization factors;
$F_1$ is the precoding vector of the UE to be scheduled.

Or, serving cell simply schedule the terminal to which PMI reported is equivalent or similar with the WPI transmitted by the base station in coordinated cell at a lower priority.

Figure 5:
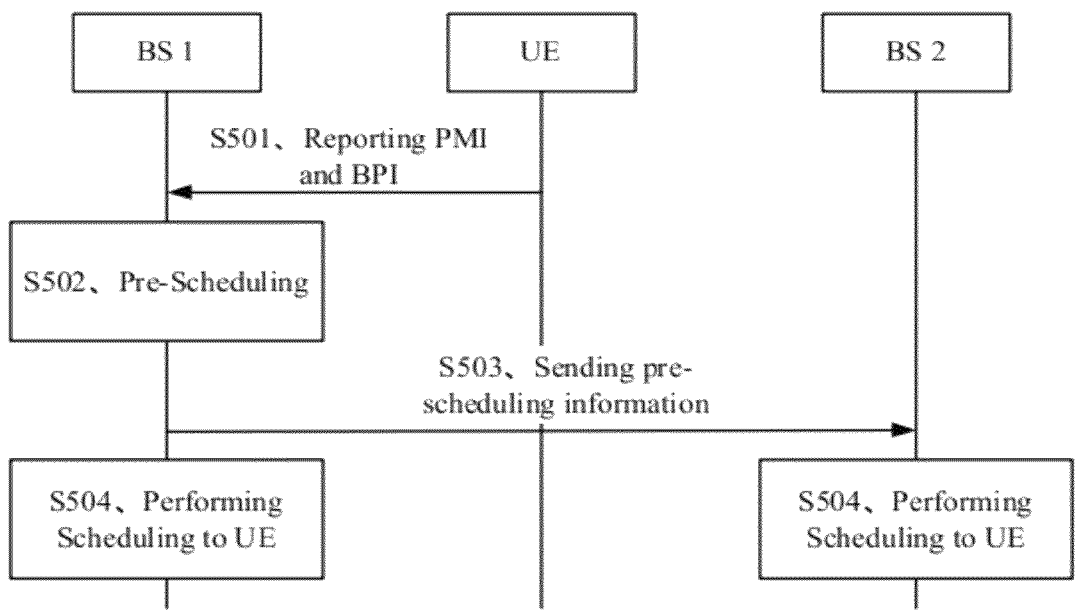
FIG. 5 is a schematic flow of a method for performing space coordination among cells in specific application scenarios, which provided by the embodiment of the invention.

In this method, if the information reported by UE is BPI, the technical proposals will adjust to following steps, as FIG. 5 shows, comprising:

Step 501, UE reporting PMI and BPI to the base station in serving cell.

Likewise as Step 401, UE choosing precoding matrix through the channel which from the base station in serving cell to UE, and reporting in the way of sending PMI to base station.

On the other hand, UE choosing precoding matrix based on the channel which from the base station in coordinated cell to UE, the precoding matrix which is chosen is with the smallest interference to the UE, and from a same collection of codebook, the index of the chosen precoding matrix in code book is noted BPI.

BPI means that if the UE is scheduled in one subband, the coordinated cell sending data at corresponding subband by the precoding matrix which corresponding to the BPI will produce the smallest interference to UE, which means the coordinated cell should use the precoding matrix which corresponding to the BPI preferentially.

PMI and BPI could be reported by wideband and subband as well. The codebook used by PMI and WPI could either be the same or different, moreover, the changes in the selection criterions for PMI and BPI would not affect the protection range of present invention.

Step 502, according to the PMI and BPI information reported by the UE in the cell and the BPI information transmitted from the base station in coordinated cell, and the service requirement of UE, the base station pre-allocating spectrum resource for UE.

On that basis, the UE would be scheduled in pre-allocated resource for a period of time in the future. The resource pre-allocated to different UE could be overlapped in frequency domain. One preferred approach is to require the BPI of coordinated cell which is reported by the UE in which the spectrum resource overlapped to be the same or similar.

Step 503, the base station transmitting the determined pre-allocated resource information for each UE to the base station in coordinated cell.

The messages transmitted comprising: the identification of UE, the resource allocated to the UE (subband), the WPI information for the UE in corresponding coordinated cell.

It needs to be mentioned that the BPI information reported by UE is corresponding to coordinated cell, the UE has a corresponding BPI in each coordinated cell, therefore, after performing pre-scheduling, it is the WPI information which corresponding to the coordinated cell that the base station needs to transmit to the base station in coordinated cell.

Step 504, the base station performing coordinated scheduling based on the resource information pre-allocated to serving cell and coordinated cell.

The pre-allocated resource which is allocated by the resource on each subband at a higher priority comprise the UE of the subband, moreover, each base station will receive the pre-scheduling information from coordinated cell, therefore, when scheduling in each subband, the base station should use the BPI in which the UE is pre-scheduled in the subband by the coordinated cell, or use approximate precoding matrix preferentially.

In conclusion, if the channel information in corresponding resource is the BPI of the resource corresponding to terminal, according to the pre-scheduling information, the base station in coordinated cell scheduling the terminal to which PMI reported is equivalent or similar with the BPI transmitted by the base station in the coordinated cell at a higher priority.

Figure 6:
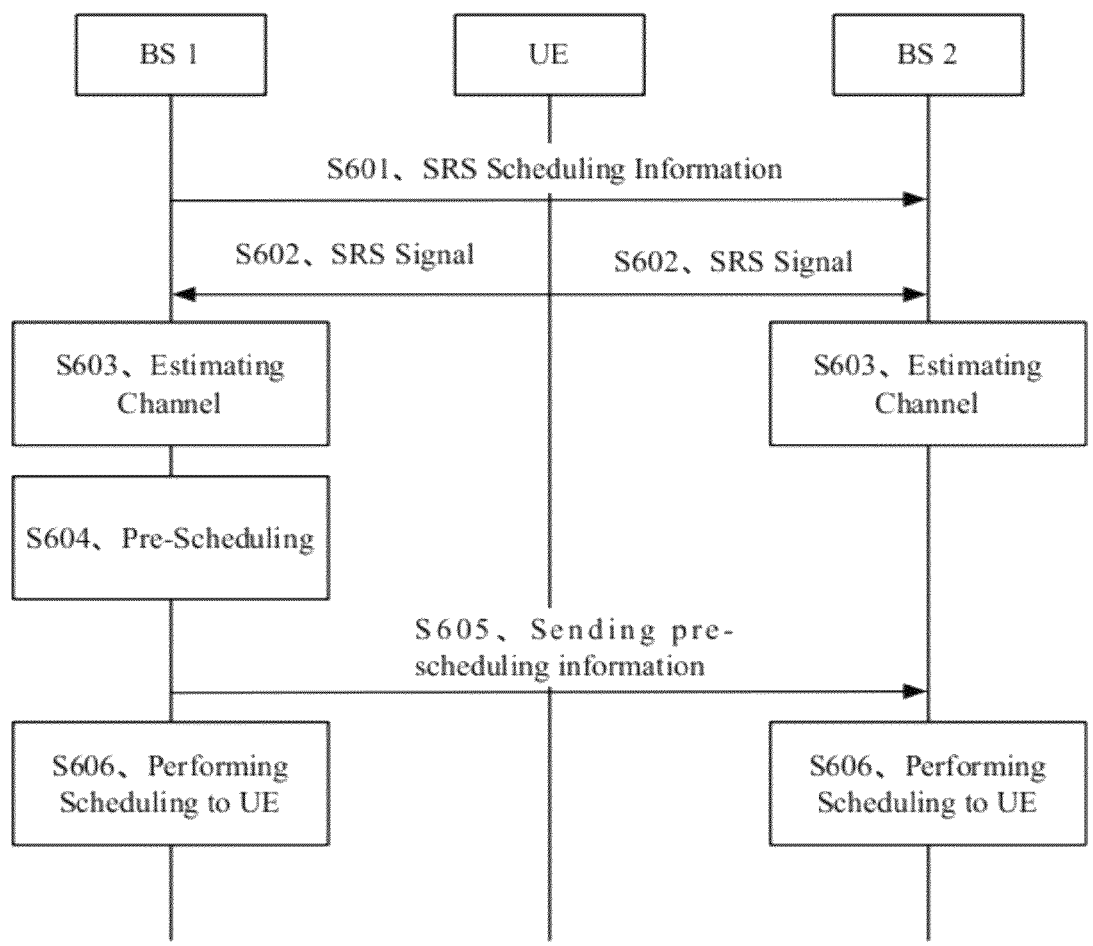
FIG. 6 is a schematic flow of another method for performing space coordination among cells in specific application scenarios, which provided by the embodiment of the invention.

FIG. 6 is a schematic flow of another method for performing space coordination among cells in specific application scenarios, which provided by the embodiment of the invention, in particular it comprising following steps:

Step 601, the base station transmitting the SRS scheduling information of UE to the base station in coordinated cell.

The information transmitted comprising; the cycle of SRS scheduling, the excursion of subframe, the basic sequence, the location of time-frequency resource, the value of cycle shift and so on.

Step 602, the UE sending SRS signal in line with the resource instructed by the base station in serving cell.

Step 603, the base station either in serving cell and coordinated cell estimating the channel information that from UE to itself.

As in Step 601, the SRS scheduling information of UE has been transmitted to the base station in coordinated cell, as a result, the base station in the coordinated cell could estimate the channel information of UE.

Step 604, according to the channel information of the UE in cell and the service requirement of UE, the base station pre-allocating spectrum resource for UE.

In that case, the UE would be scheduled in pre-allocated resource for a period of time in the future. The resource pre-allocated to different UE could be overlapped in frequency domain. One preferred approach is to require the arrival direction angle DOA of UE in which the spectrum resource overlapped to be the same or similar.

Step 605, the base station transmitting the determined pre-allocated resource information for each UE to the base station in coordinated cell.

The information transmitted comprising: UEID, the resource allocated to UE (or subband).

Step 606, the base station performing coordinated scheduling based on the resource information pre-allocated to the UE of serving cell and coordinated cell.

The pre-allocated resource which is allocated by the resource on each subband at a higher priority comprise the subband of the UE, moreover, each base station receive the pre-scheduling information from coordinated cell, as a result, when scheduling each subband, the base station has acknowledged what UE would be scheduled in the subband, and the channel information of the UE (obtained in Step 603).

When performing scheduling, the base station needs to avoid/repress the interference to the UE that might be scheduled in coordinated cell based on channel information, the following two methods are included:

Method 1, which is achieved by separating DoA angle, the angle of signal arriving at the BS of serving cell between the UE which is pre-scheduled in coordinated cell and the terminal which is scheduled in the serving cell would be higher than a threshold value.

Method 2, by using signal processing algorithms such as ZF algorithm to control the interference to the UE in the coordinated cell.

$$[F_1, F_2] = \begin{bmatrix} H_1 \\ H_2 \end{bmatrix}^H \left( \begin{bmatrix} H_1 \\ H_2 \end{bmatrix} \begin{bmatrix} H_1 \\ H_2 \end{bmatrix}^H + \alpha I \right)^{-1}$$

$H_1$ is the channel matrix of UE which is to be scheduled in serving cell.

$H_2$ is the channel matrix that from the UE in coordinated cell to serving cell (the assumption here is that one UE is pre-scheduled in the subband by coordinated cell), α is regularization factors, $F_1$ is the precoding matrix of the UE which is to be scheduled.

Figure 7:
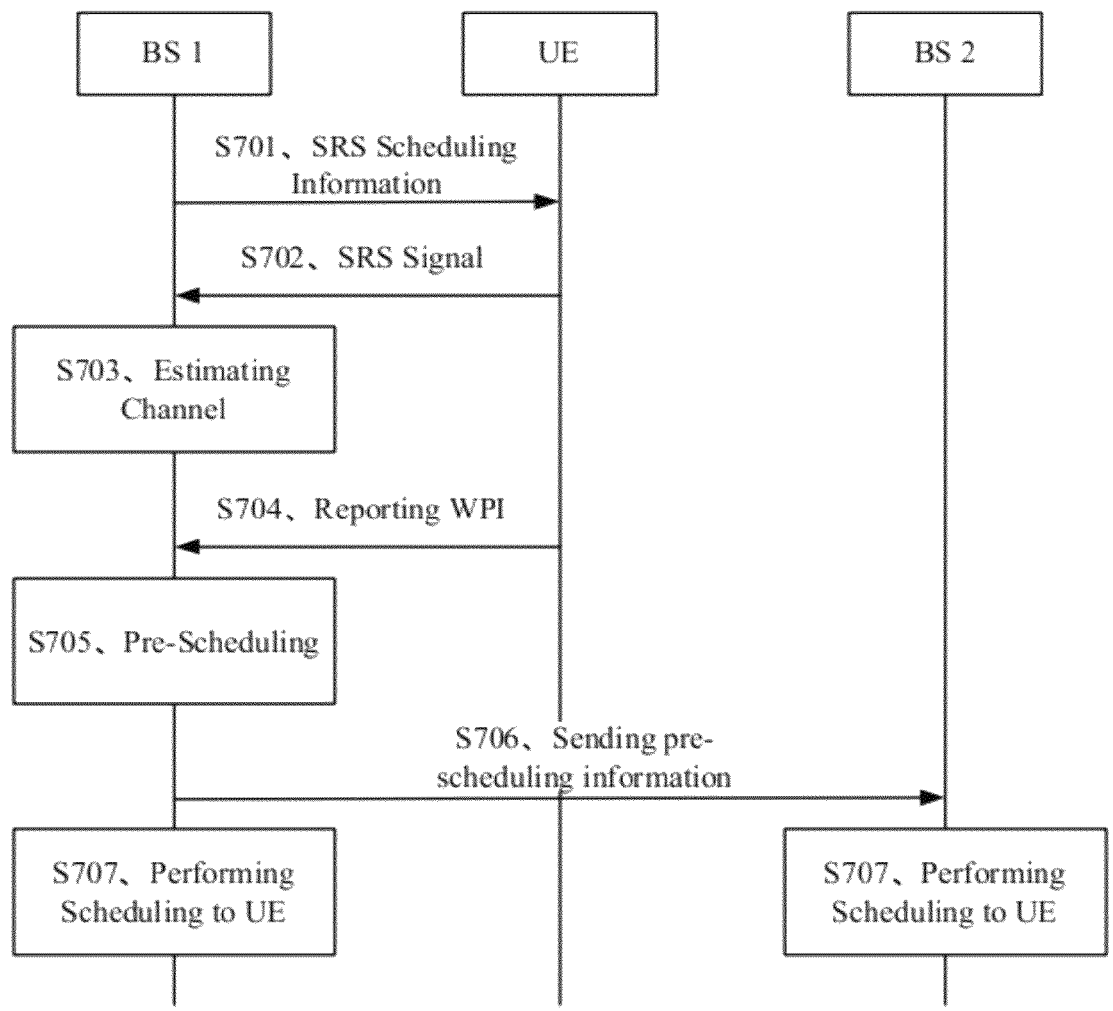
FIG. 7 is a schematic flow of another method for performing space coordination among cells in specific application scenarios, which provided by the embodiment of the invention.

FIG. 7 is a schematic flow of another method for performing space coordination among cells in specific application scenarios, which is provided by the embodiment of the invention, in particular it comprises following steps:

Step 701, the base station transmitting the SRS scheduling information of UE to UE.

The information transmitted comprising: the cycle of SRS scheduling, the excursion of subframe, the basic sequence, the location of time-frequency resource, the value of cycle shift and so on.

Step 702, the UE sending SRS signal to base station in line with the resource instructed by the base station in serving cell.

Step 703, the base station in the serving cell of UE estimating the channel information that from the UE to itself.

Step 704, UE reporting WPI information to base station.

UE choosing precoding matrix according to the channel which from the base station in coordinated cell to the UE, what is to be chosen is the precoding matrix with the largest interference to UE, and reporting the index corresponding to the chosen precoding matrix in a collection of codebook, the index of the chosen precoding matrix in a collection of codebook is marked as WPI. The selection criterions for WPI is as follows:

$$\text{WPI} = \arg\max_{k \in \{1,2,\ldots,N\}} \|H_2 V_k\|^2$$

N is the number of element in the set of codebook, $H_2$ is the channel matrix from the base station in the coordinated cell to the UE.

$\{V_1, \ldots, V_N\}$ is pre-defined codebook.

WPI could be reported by wideband, as well as subband. Moreover, the selection criterions for WPI is just a preferred embodiment of the present invention, and it will vary based on the specific system needs, and has no effect on the protection range of present invention.

Step 705, the base station according to the channel information and the WPI information, and the service requirement of UE, pre-allocating spectrum resource for UE.

The UE would be scheduled in pre-allocated resource for a period of time in the future. The resource pre-allocated to different UE could be overlapped in frequency domain. One preferred approach is to require the WPI of coordinated cell reported by the UE in which the spectrum resource overlapped to be the same.

Step 706, the base station transmitting the determined pre-allocated resource information for each UE to the base station in coordinated cell.

The information transmitted comprising: the identification of UE, the resource allocated to the UE (subband), the WPI information for the UE in corresponding coordinated cell.

Step 707, the base station performing coordinated scheduling based on the resource information pre-allocated to serving cell and coordinated cell.

The pre-allocated resource which is allocated by the resource on each subband at a higher priority comprise the subband of the UE, moreover, each base station receive the pre-scheduled information from coordinated cell, as a result, when scheduling in each subband, the base station should try to avoid using the WPI in which the UE is pre-scheduled in the subband by the coordinated cell, or avoid using approximate precoding matrix.

Furthermore, actually the WPI could be treated as a direction information, the base station could control the interference on this direction by signal processing algorithms such as ZF algorithm while scheduling.

$$[F_1, F_2] = \begin{bmatrix} H \\ V^H \end{bmatrix}^H \left( \begin{bmatrix} H \\ V^H \end{bmatrix} \begin{bmatrix} H \\ V^H \end{bmatrix}^H + \alpha I \right)^{-1}$$

H is the channel matrix of the UE to be scheduled,
V is the precoding matrix corresponding to WPI,
$\alpha$ is regularization factors,
$F_1$ is the precoding vector of the UE to be scheduled.

Moreover, in the scheme shown as FIG. 4 and FIG. 7, UE report the adjacent area WPI, actually UE could report BPI instead of the WPI, the interference to UE would be the smallest if the coordinated cell adopt the precoding matrix which corresponding to the BPI.

In this way, when performing scheduling, the base station acquires to use the BPI in which the UE is pre-scheduled in the corresponding subband by the coordinated cell. In the scheme shown as FIG. 4 and FIG. 7, the WPI information or the BPI information that interacted among the base stations could be a long-term information through statistic for a period of time, as well as a short-term information calculated instantaneously.

Preferably, in the embodiment of the present invention, the base station could interact WPI information and BPI information from each other, when scheduling in each subband, the base station should try to avoid using the WPI in which the UE is pre-scheduled in the subband by coordinated cell, or avoid using approximate precoding matrix. Meanwhile, the base station should use the BPI in which the UE is pre-scheduled in the subband by the coordinated cell, or use approximate precoding matrix preferentially.

Compare with present technique, the method of the invention has the following advantages:

With the solution of the present invention, the pre-scheduling information is transferred between base stations in various coordinated transmission cells, and the coordinated scheduling/beam-forming is performed according to the pre-scheduling information, thus, the coordinated scheduling/beam-forming is implemented with less amount of information exchange, and the spectrum efficiency of cell-edge terminal is improved.

To fulfill the technical proposal of the invention, a base station is provided in the embodiment of the invention, which applies in the mobile communication system that comprise multiple cells, one of the multiple cells is serving cell of terminal, one or more cells of the other cells are coordinated cell of terminal, the base station that corresponding to each cell provide cooperative transmission service for terminal.

Figure 8:
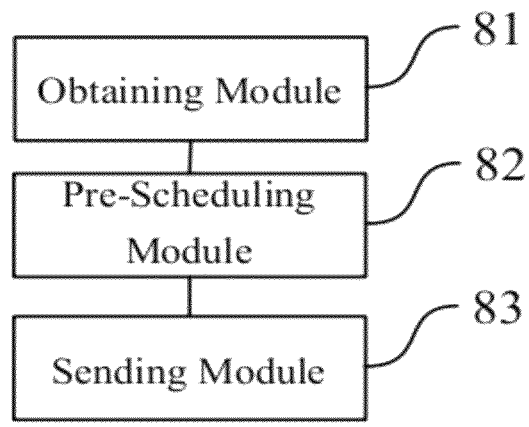
FIG. 8 illustrates an example base station provide by the embodiment of the invention.

FIG. 8 illustrates an example base station provided by the embodiment of the invention, when the said base station is corresponding to the said serving cell, comprising:

Obtaining Module 81 for obtaining the channel information of the terminal;

The channel information of the terminal obtained by the obtaining module 81 comprising:

The obtaining module receiving the channel information reported by terminal; or, The obtaining module receiving the SRS signal sent by terminal, and obtaining the channel information of the terminal according to the SRS signal.

On the other hand, while obtaining the channel information of terminal, the obtaining module also obtaining the precoding matrix information of coordinated cell, comprising:

The WPI of coordinated cell; or,

The BPI of coordinated cell; or,

The precoding matrix occupancy information comprised in pre-scheduled information sent by base station in coordinated cell.

Pre-scheduling module 82 for performing pre-scheduling to terminal according to the channel information obtained by obtaining module 81 and the service requirement of the terminal;

Sending module 83 for transmitting the pre-scheduling information generated by the pre-scheduling module 82 to the base station in coordinated cell, so that the base station in the coordinated cell could perform coordinated scheduling/coordinated beam-forming together with the base station in serving cell.

In practical application conditions, the specific processing comprising following 3 situations:

If the precoding matrix information of coordinated cell obtained by the obtaining module 81 is the WPI of the coordinated cell, the pre-scheduling module performing pre-scheduling to terminal, according to the channel information and the service requirement of terminal obtained by the obtaining module 81, while performing pre-scheduling to the terminal, the pre-scheduling module avoid occupying the resource corresponding to the WPI.

If the precoding matrix information of coordinated cell obtained by the obtaining module 81 is the BPI of the coordinated cell, the pre-scheduling module performing pre-scheduling to terminal, according to the channel information and the service requirement of terminal which obtained by the obtaining module 81, while performing pre-scheduling to the terminal, the pre-scheduling module occupy the resource corresponding to the BPI preferentially.

If the precoding matrix information of coordinated cell which obtained by the obtaining module 81 is the precoding matrix occupancy information which comprised in the pre-scheduling information sent by the base station in the coordinated cell, according to the channel information and the service requirement of terminal which obtained by the obtaining module 81, the pre-scheduling module 82 choose the resource with the smallest interference to perform pre-scheduling for terminal.

On the other hand, the embodiment of the invention provides another base station, which also applied in the system.

Figure 9:
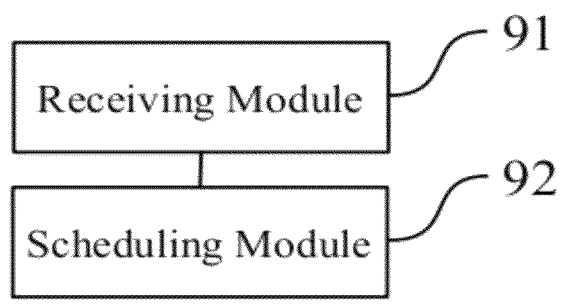
FIG. 9 illustrates another example base station provide by the embodiment of the invention.

When the said base station is corresponding to said serving cell, as shown in FIG. 9, comprising:

Receiving module 91 for receiving the pre-scheduling information sent by the base station in coordinated cell and the channel information of the terminal which to be scheduled in serving cell;

The pre-scheduling information transmitted by the base station in coordinated cell comprises identification information of the terminal, the resource information which allocated to the terminal, the precoding matrix information of the resource corresponding to the terminal.

The channel information of the terminal to be scheduled in serving cell comprise the identification information of the terminal in serving cell, the resource information which allocated to the terminal and/or the precoding matrix information of the resource corresponding to the terminal.

Scheduling module 92 for performing coordinated scheduling/coordinated beam-forming based on the pre-scheduling information received by the receiving module 91 and the channel information of the terminal which to be scheduled in serving cell.

In the specific application scenario, if the pre-scheduling information received by the receiving module 91 does not comprise the precoding matrix information of the resource corresponding to the terminal, the processing for scheduling module 91 is like following:

The scheduling module 92 for ensuring that the angle of signal arriving at the BS of serving cell between the terminal which is pre-scheduled in coordinated cell and the terminal which is to be scheduled in the serving cell would be higher than a pre-defined threshold value; or, The scheduling module 92 calculating the precoding matrix of the terminal to be scheduled according to the channel information of the terminal to be scheduled and/or the precoding matrix information of the resource corresponding to the terminal.

Compare with present technique, the embodiments of the invention has the following advantages:

With the solution of the present invention, the pre-scheduling information is transferred between base stations in various coordinated transmission cells, and the coordinated scheduling/beam-forming is performed according to the pre-scheduling information, thus, the coordinated scheduling/beam-forming is implemented with less amount of information exchange, and the spectrum efficiency of cell-edge terminal is improved.

While there have been shown and described illustrative embodiments that perform space coordination among cells, it is to be understood that various other adaptations and modifications may be made within the spirit and scope of the present invention. The foregoing description has been directed to specific embodiments of this invention. It will be apparent, however, that other variations and modifications may be made to the described embodiments, with the attainment of some or all of their advantages. For instance, it is expressly contemplated that the components and/or elements described herein can be implemented as software, including a computer-readable medium having program instructions executing on a computer, hardware, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

The invention claimed is:

1. A method for performing space coordination among cells, which applies in mobile communication system that comprises multiple cells, one of said multiple cells is the serving cell of terminal, one or more cells of the other cells are coordinated cell of said terminal, the base station that corresponding to each said cell provide cooperative transmission service for said terminal, comprising:

The base station in said serving cell obtaining the channel information of said terminal;

The base station in said serving cell performing pre-scheduling to said terminal according to the acquired channel information of said terminal and the service requirement of said terminal;

The base station in said serving cell transmitting the pre-scheduling information to the base station in said coordinated cell, so that the base station in said coordinated cell performing coordinated scheduling/coordinated beam-forming together with the base station in said serving cell based on said pre-scheduling information.

2. The method as in claim 1, characterized in that: the base station in said serving cell obtaining the channel information of said terminal, comprising:

The base station in said serving cell receiving the channel information reported by said terminal; or, The base station in said serving cell receiving the reference signal of channel sounding, which is SRS signal, and obtaining the channel information of said terminal based on said SRS signal.

3. The method as in claim 1, further comprising:

The base station in said serving cell obtaining the precoding matrix information of said coordinated cell;

Therein the precoding matrix information of said coordinated cell comprising:

The worst precoding matrix indicator WPI of said coordinated cell; and/or,

The best precoding matrix indicator BPI of said coordinated cell.

4. The method as in claim 3, characterized in that: according to the acquired channel information of said terminal and the service requirement of said terminal, the base station in said serving cell performing pre-scheduling to said terminal, comprising:

If the precoding matrix information of said coordinated cell is the WPI of said coordinated cell, the base station in serving cell performing pre-scheduling to said terminal according to the obtained channel information of said terminal and the service requirement of said terminal, when performing pre-scheduling, the said base station avoiding occupying the resource corresponding to said WPI; and/or, If the precoding matrix information of said coordinated cell is the WPI of said coordinated cell, the base station in serving cell performing pre-scheduling to said terminal according to the obtained channel information of said terminal and the service requirement of said terminal, when performing pre-scheduling, the said base station occupying the resource corresponding to said BPI preferentially.

5. The method as in claim 3, characterized in that: the precoding matrix information of said coordinated cell, comprising:

The precoding matrix occupancy information comprised in pre-scheduling information sent by the base station in said coordinated cell;

Therein, if the precoding matrix information of said coordinated cell is the precoding matrix occupancy information comprised in pre-scheduling information sent by the base station in said coordinated cell, the base station in said serving cell according to the obtained channel information of said terminal and the service requirement of said terminal, choose the resource with the smallest interference to perform pre-scheduling to said terminal.

6. The method as in claim 1, characterized in that: the pre-scheduling information transmitted from the base station in said serving cell to the base station in said coordinated cell, comprising:

The identification information of said terminal, the resource information allocated to said terminal and/or the space information in resource corresponding to said terminal.

7. A method for performing space coordination among cells, which applies in mobile communication system that comprises multiple cells, one of said multiple cells is serving cell of terminal, one or more cells of the other cells are coordinated cell of said terminal, the base station that corresponding to each said cell provide cooperative transmission service for said terminal;

The base station in said serving cell receiving the pre-scheduling information sent by the base station in coordinated cell and the channel information of the terminal which to be scheduled in serving cell;

The base station in said serving cell according to said pre-scheduling information and the channel information of the terminal which to be scheduled in said serving cell, performing coordinated scheduling/coordinated beam-forming.

8. The method as in claim 7, characterized in that: the base station in said serving cell receiving the pre-scheduling information sent by the base station in said coordinated cell, comprising:

The identification information of the terminal which to be pre-scheduled in coordinated cell, the resource information allocated to the terminal which to be pre-scheduled in said coordinated cell and/or the space information of the resource corresponding to the terminal which to be scheduled in said coordinated cell.

9. The method as in claim 7, characterized in that: the channel information of the terminal which to be scheduled in said serving cell, comprising:

The identification information of the terminal which to be scheduled in said serving cell, the resource information allocated to said terminal and/or the space information in resource corresponding to said terminal.

10. The method as in claim 7, characterized in that: the base station in said serving cell according to the said pre-scheduling information and the channel information of the terminal which to be scheduled in said serving cell, performing coordinated scheduling/coordinated beam-forming, comprising:

The BS in said serving cell ensuring that the angle of signal arriving at the BS of said serving cell between the terminal which is pre-scheduled in said coordinated cell and the terminal which is to be scheduled in said serving cell would be higher than a pre-defined threshold value; or, The base station in said serving cell calculating the precoding matrix of the terminal which to be scheduled based on the channel information of the terminal which to be scheduled and the resource information allocated to the terminal which to be scheduled in said coordinated cell and/or the precoding matrix information of the resource corresponding to the terminal which to be scheduled in said coordinated cell.

11. A base station, which applies in the mobile communication system that comprise multiple cells, one cell of said multiple cells is serving cell of terminal, one or more cells of the other cells are coordinated cell of said terminal, the base station that corresponding to each said cell provide cooperative transmission service for said terminal, characterized in that: when said base station is corresponding to said serving cell, comprising:

Obtaining module for obtaining the channel information of said terminal;

Pre-scheduling module for performing pre-scheduling to said terminal based on the channel information of said terminal which is obtained by said obtaining module and the service requirement of said terminal;

Sending module for transmitting the pre-scheduling information which generated by said scheduling module to the base station in said coordinated cell, so that the base station in coordinated cell could perform coordinated scheduling/coordinated beam-forming together with the base station in serving cell according to said pre-scheduling information.

12. The base station as in claim 11, characterized in that:

The said obtaining module applying in receiving the channel information reported by said terminal; or, Receiving the SRS signal sent by said terminal, and obtaining the channel information of said terminal according to said SRS signal.

13. The base station as in claim 11, characterized in that:

The said obtaining module, also applying in obtaining the precoding matrix information of said coordinated cell;

Therein, the precoding matrix information of said coordinated cell comprising:

The WPI of said coordinated cell; and/or,

The BPI of said coordinated cell.

14. The base station as in claim 13, characterized in that: the said pre-scheduling module applying in:

If the precoding matrix information of said coordinated cell which obtained by said obtaining module is the WPI of said coordinated cell, according to the channel information of said terminal obtained by the obtaining module and the service requirement of said terminal, performing pre-scheduling to said terminal, when performing pre-scheduling to said terminal, the said pre-scheduling module avoiding occupying the resource corresponding to said WPI; and/or, If the precoding matrix information of said coordinated cell which obtained by said obtaining module is the BPI of said coordinated cell, according to the channel information of said terminal which obtained by said obtaining module and the service requirement of said terminal, performing pre-scheduling to said terminal, when performing pre-scheduling to said terminal, the said pre-scheduling module occupying the resource corresponding to said BPI preferentially.

15. The base station as in claim 13, characterized in that:

The said obtaining module, also applying in obtaining precoding matrix occupancy information comprised in the pre-scheduling information sent by the base station in said coordinated cell;

The said pre-scheduling module, which is also applying in: when the precoding matrix information obtained by said obtaining module is the precoding matrix occupancy information comprised in the pre-scheduling information sent by the base station in said coordinated cell, according to the channel information of said terminal which obtained by the obtaining module and the service requirement of said terminal, choosing the resource with the smallest interference to perform pre-scheduling to said terminal.

16. A base station, which is applying in the mobile communication system that comprise multiple cells, one cell of said multiple cells is serving cell of the terminal, one or more cells of the other cells are coordinated cell of said terminal, the base station that corresponding to each said cell provide cooperative transmission service for said terminal, characterized in that: when the said base station is corresponding to said serving cell, comprising:

Receiving module for receiving the pre-scheduling information sent by the base station in said coordinated cell and the channel information of the terminal which to be scheduled in said serving cell;

Scheduling module for performing coordinated scheduling/coordinated beam-forming based on the pre-scheduling information received by said receiving module and the channel information of the terminal which to be scheduled in said serving cell.

17. The base station as in claim 16, characterized in that: the said scheduling module is applying in:

Ensuring that the angle of signal arriving at the BS of said serving cell between the terminal which is pre-scheduled in said coordinated cell and the terminal which is to be scheduled in said serving cell would be higher than a pre-defined threshold value; or, Calculating the precoding matrix of the terminal which to be scheduled based on the channel information of the terminal which to be scheduled and the resource information allocated to the terminal which to be scheduled in said coordinated cell and/or the precoding matrix information of the resource corresponding to the terminal which to be scheduled in said coordinated cell.

\* \* \* \* \*